I. HECHENBLEIKNER.
ABSORPTION OR CONCENTRATING PLANT.
APPLICATION FILED OCT. 31, 1918.
1,314,802.
Patented Sept. 2, 1919.
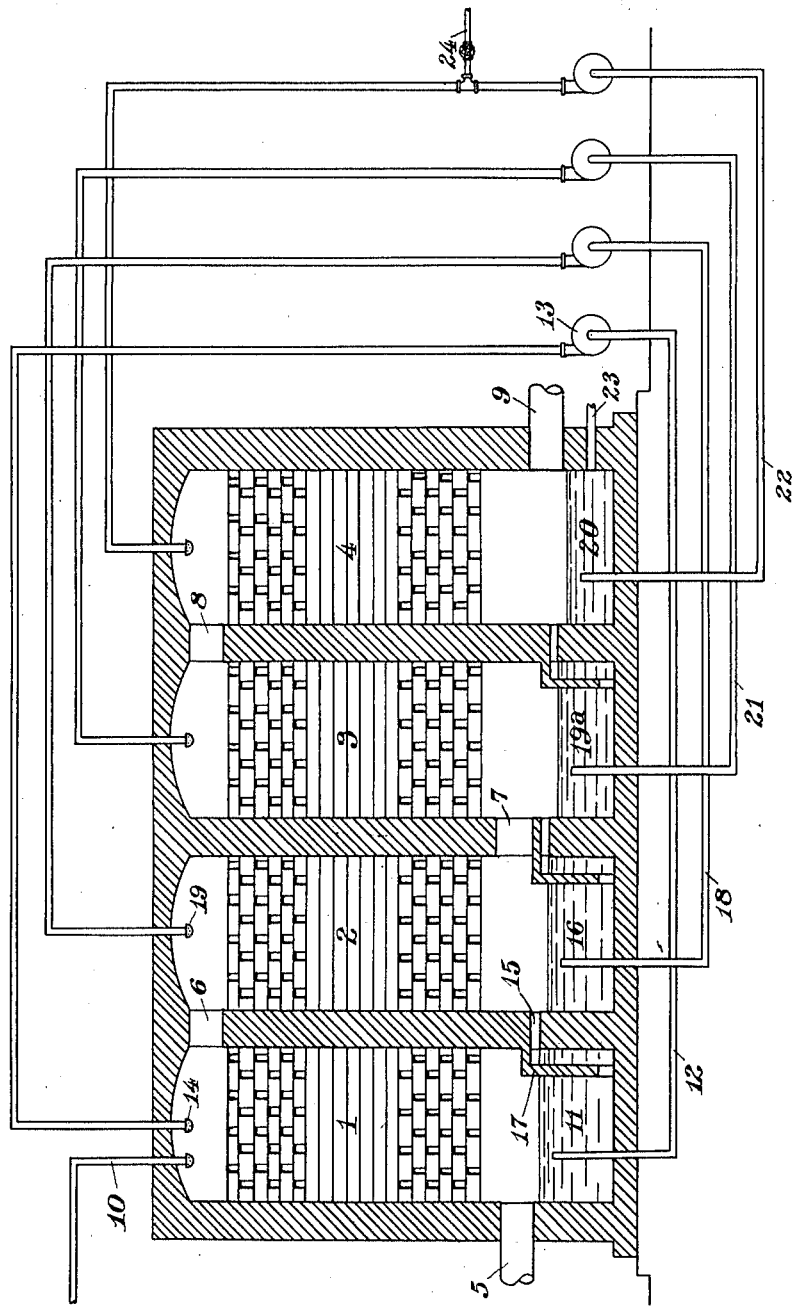
Inventor
J. Hechenbleikner
By
Attorney

UNITED STATES PATENT OFFICE.

INGENUIN HECHENBLEIKNER, OF CHARLOTTE, NORTH CAROLINA, ASSIGNOR TO CHEMICAL CONSTRUCTION COMPANY, OF CHARLOTTE, NORTH CAROLINA, A CORPORATION OF NORTH CAROLINA.

ABSORPTION OR CONCENTRATING PLANT.

1,314,802. Specification of Letters Patent. Patented Sept. 2, 1919.

Application filed October 31, 1918. Serial No. 260,625.

*To all whom it may concern:*

Be it known that I, INGENUIN HECHENBLEIKNER, a citizen of the United States, residing at Charlotte, in the county of Mecklenburg and State of North Carolina, have invented certain new and useful Improvements in Absorption or Concentrating Plants, of which the following is a specification.

This invention relates to absorption or concentrating plants particularly adapted for use in the manufacture or concentration of nitric acid although capable of use in connection with the concentration of other acids or liquids.

The object of the invention is to improve the construction and operation of such plants with respect to the manner in which, and the means by which, the weak acid is transferred from one tower to the next. Heretofore, in the practical operation of such plants, difficulty has been experienced in producing or maintaining a proper rate of flow through the respective towers, and extensive piping systems have been required. controlled as a rule by hand, leading to uncertainty and unevenness with respect to the flow and the concentrating action. The present invention employs an automatic or overflow transfer system by means of which the weak acid is transferred from one tower to the next in the series, the rate of flow being practically uniform and governed by the desired or pre-determined rate of concentration. Instead of pumping the weak acid from the bottom of one tower to the top, and then switching the same by hand-controlled valves from one tower to the next, the transfer is effected from the bottom of one tower to the bottom of the next, automatically through sealed or luted passages, and then the weak acid is pumped from the bottom to the top of the tower without any hand controlled valves at the top for switching from one tower to the next. There is, therefore, an overflow circulation from the bottom of one tower to the bottom of the next in the series, and a pump circulation through each tower. The course of the gases remains practically the same as heretofore.

The invention is illustrated in the accompanying drawing which is a diagram in a simplified form, of a structure embodying the system.

In the drawing, I have shown a battery of four towers in a row. Practically, it is usual to employ two rows side by side, but the principle remains the same under various conditions.

In the drawing, 1, 2, 3 and 4 indicate a series of towers through which water and gas are flowed for absorption or concentration purposes. The gas inlet to the bottom of tower No. 1 is indicated at 5 and from this the gas flows upwardly through the checker work or filling in said tower to the outlet 6 leading to the top of tower No. 2, through which it flows downwardly to the passage 7 into the lower part of tower No. 3, and thence upwardly through the outlet 8 into the top of tower No. 4 and downwardly to the final gas outlet 9 at the bottom of said tower. The gas thus flows up and down through the successive towers from the inlet to the final outlet. Water is admitted to the top of tower No. 1 by an inlet indicated at 10 and flows down through the checker work in said tower in a direction opposite to the gases which are absorbed by the water forming a weak acid which collects in the reservoir 11 at the bottom of tower No. 1. From this reservoir the weak acid is pumped through a pipe line 12 and pump 13 to a sprayer 14 at the top of tower No. 1 and by this means the weak acid can be circulated repeatedly through the tower.

From the reservoir 11 at the bottom of tower No. 1, the weak acid overflows through the sealed opening 15 into the reservoir 16 at the bottom of tower No. 2. This overflow opening 15 is water sealed or luted by a depending overhanging wall 17 which extends downwardly far enough to take the acid from the lower part of the reservoir whereby the acid which overflows is the heaviest and strongest contained in said reservoir. In tower No. 2 the same operation is repeated. That is, the acid is pumped from the reservoir 16 through the pipe line 18 to the sprayer 19 at the top of tower No. 2 and passes down through the checker work into the reservoir, and then in similar manner the acid overflows from the reservoir 16 to the reservoir 19ª of tower No. 3 and finally to the reservoir 20 of tower No. 4, an individual circulation for each tower being provided through the pipe lines 21 and 22 and their connected pumps. Finally the dense acid may be drawn off through the outlet 23 from the reservoir at the bottom of the tower No. 4; or it may be drawn off from the pipe line 22 by a valved branch 24 leading to storage when desired.

Because of the final outlet from the tower No. 4 and the water inlet to tower No. 1, the levels of the liquid in the reservoirs of the towers 1, 2, 3 and 4 will be successively lower and because of this difference in level an automatic transfer of the liquid will occur from one tower to the next, and the attention of an operator to effect this transfer by pumps or otherwise as heretofore is unnecessary. Each tower will be automatically supplied by the overflow which at the same time prevents any choking or piling up of the acid in one tower incident to excessive pump supply. The pump circulation, instead of being employed to transfer from one tower to the next, acts merely to maintain a circulation within each tower. This dispenses with considerable piping and attention on the part of an operator, and insures an even and regular flow of the acid through the plant and an even distribution of the absorbing or concentrating action through the series.

Obviously, instead of arranging all the towers in one row, a number may be arranged in two rows side by side, and the automatic transfer of the liquid effected by the overflow outlets leading from the reservoirs in one row to those in the adjacent row. The rate of flow is controlled by regulation of the water inlet only and this governs the rate of flow throughout the whole series, which is very advantageous in practical operation, little or no attention being necessary after the apparatus is once set for efficient operation. The automatic or overflow transfer makes unnecessary manual adjustment of valves or the like between the successive towers as heretofore and corrects the uncertainties and objections incident thereto.

I claim:

1. The combination of a plurality of towers having reservoirs at the bottom thereof and overflow outlets for liquid from one reservoir to another, means to pump liquid from each reservoir to the top of its tower, and means to flow gases through the towers in the same direction in the series as the liquid flows.

2. The combination of a succession of towers having reservoirs at the bottom thereof and liquid-sealed overflow outlets for liquid from one reservoir to the next, said outlets being at successively lower levels, means to flow gas through the towers in the same direction in the series as the liquid flows, and means to pump liquid from each reservoir to the top of its tower.

3. The combination of a succession of towers having reservoirs for liquid at the bottom thereof and overflow outlet passages from one reservoir to the next, said passages being sealed by the liquid and having inlets near the lower part of said reservoirs, whereby to take the heavier liquid therefrom, and said passages discharging at successively lower levels, means to flow gas through the towers in the same direction in the series as the liquid flows, and means to pump liquid from each reservoir into the top of its tower.

4. The combination of a succession of absorption towers having a water inlet at one end and an acid outlet at the other and liquid reservoirs at the bottom of the towers, overflow passages from one reservoir to the next, at successively lower levels, means to flow gas through the towers in the same direction in the series as the liquid flows, and means to pump liquid from each reservoir to the top of its tower.

In testimony whereof I affix my signature in presence of two witnesses.

INGENUIN HECHENBLEIKNER.

Witnesses:
W. A. CRANDALL,
HOWARD MORRISON.